Figure 1:
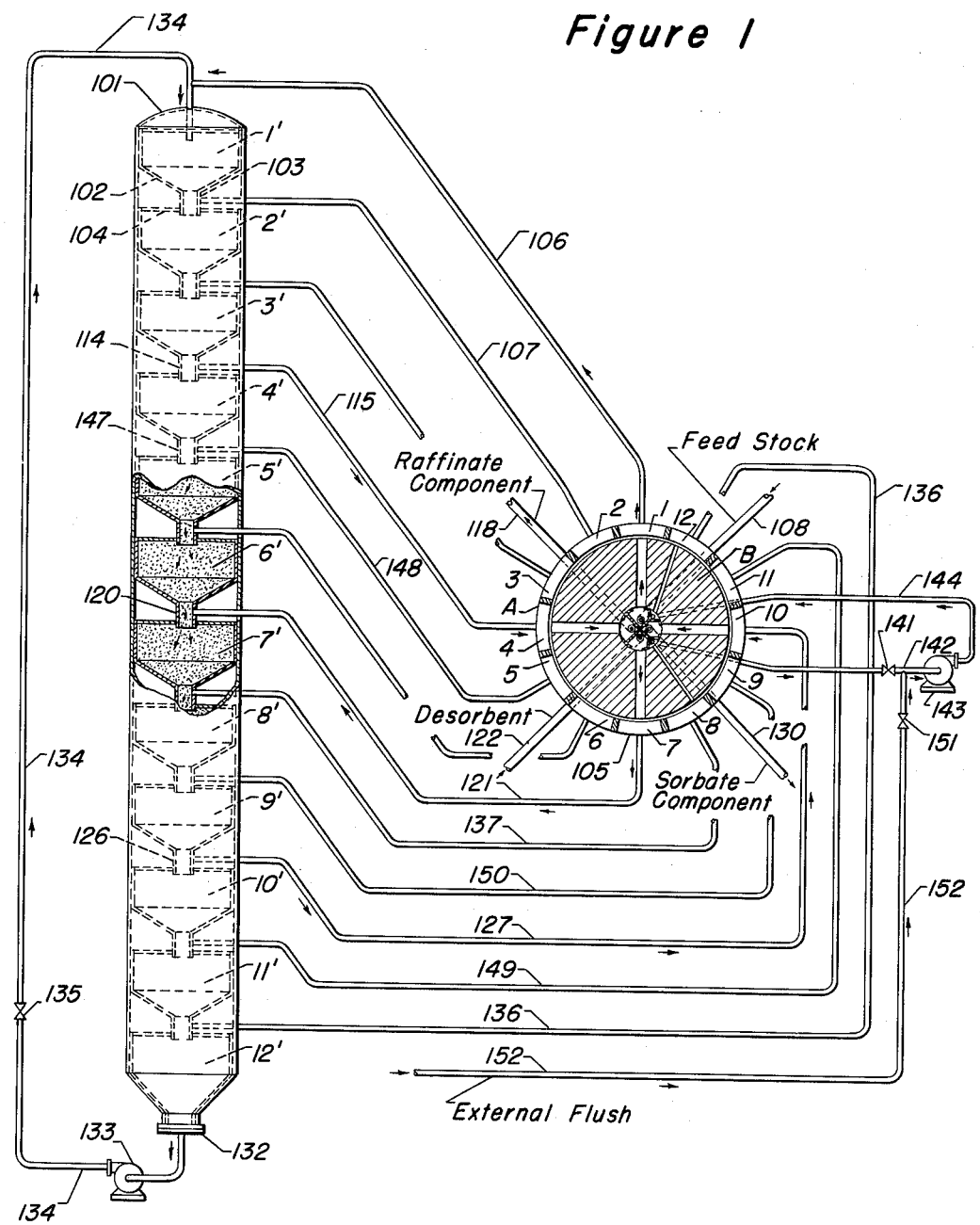

INVENTORS
Laurence O. Stine
Donald B. Broughton
BY: Chester J. Giuliani
Donald E. Moehling
ATTORNEYS United States Patent Office 3,201,491
Patented Aug. 17, 1965

3,201,491
CONTINUOUS SORPTION PROCESS WITH
EMPHASIS ON PRODUCT PURITY
Laurence O. Stine, Western Springs, and Donald B.
Broughton, Chicago, Ill., assignors to Universal
Oil Products Company, Des Plaines, Ill., a corporation of Delaware
Filed Sept. 5, 1962, Ser. No. 223,867
7 Claims. (Cl. 260—676)

This application is a continuation-in-part of our copending application Serial Number 814,587, filed May 20, 1959, now abandoned.

This invention relates to a process for fractionating the components in a mixture of compounds by contacting said mixture with an elongated bed or with a plurality of serially interconnected fixed beds of solid sorbent having a selective sorbency for at least one or more components of said mixture and substantially lesser sorbency for at least one other component of the feed mixture. More specifically, the present invention concerns an improvement in the separation process described in U.S. Patent 2,985,589, in which process a feed stock mixture of the above components is continuously charged into a fixed mass of solid particles of sorbent while simultaneously a stream of desorbent capable of displacing selectively retained sorbate component(s) is charged into a further downstream portion of the mass of sorbent particles, raffinate comprising relatively non-sorbed component(s) of the feed mixture and desorbed sorbate are concurrently withdrawn from portions of the mass of sorbent particles downstream, respectively, from the feed inlet and desorbent inlet, fluid effluent from one portion of said mass of particles is pumped at an elevated pressure into the next adjacent portion of the mass of particles to thereby provide continuously cyclic fluid flow, and all of the inlets and outlets for each of the foregoing streams flowing into and from the mass of sorbent particles are simultaneously shifted in the direction of the continuously flowing fluid stream to thereby provide simulated countercurrent flow of the solid particles relative to the perfluent stream of fluid. The improvement in the foregoing process to which this invention relates comprises introducing a flush stream, consisting of a fluid separable from the feed stock, such as sorbate or desorbent, into the process flow through the lines, pumps, valves and other equipment last previously carrying feed stock and in an amount sufficient to purge residual feed stock from such equipment and thereby avoid contamination of the sorbate product with the raffinate present in such feed stock residue when the sorbate product stream is subsequently withdrawn from the process through the lines and equipment last previously utilized to convey feed stock into the process flow.

Utilizing the improved flow of the present invention, exceptionally pure sorbate and raffinate products, in the range of 98 to 99+ percent purities may be obtained, the purity of the product being substantially greater than the products obtainable from the process in the absence of the present improvement.

In one of its embodiments, this invention relates to an improvement in the process for continuously separating the components of a mixture of fluids, at least one of which is selectively retained by contact of the mixture with a solid sorbent and at least one other component of which is relatively less sorbed by the sorbent, in which process a feed inlet stream comprising said feed mixture is continuously and successively charged into each zone of a plurality of serially interconnected contact zones, each zone containing a fixed mass of said sorbent, a stream of desorbent capable of displacing selectively retained sorbate component from said sorbent is substantially simultaneously charged into an upstream contact zone containing sorbate component retained by the sorbent in the last previous cycle of operation, an outlet stream comprising relatively less sorbed component of said mixture is substantially simultaneously withdrawn from a zone between the inlet of said zone receiving the feed stream and the inlet of the zone receiving said desorbent, a mixture of sorbate component and desorbent is substantially simultaneously withdrawn through a sorbate outlet between the inlet of the zone receiving desorbent and the inlet of the zone receiving said feed stream, a recycle stream of fluid is continuously withdrawn from the outlet of one fixed mass of sorbent and charged at a higher pressure into the inlet of the next downstream fixed mass of sorbent in the series of zones, each of the influent and effluent streams being directed during the process into and out of each of the zones through a fluid distribution center which advances the inlet and outlet points for said streams simultaneously and equidistantly in a downstream direction, the improvement in said process which comprises charging a flush stream comprising a fluid separable from said feed stock into the fluid inlet next upstream relative to the feed stream inlet in an amount not substantially exceeding the volume of fluid in the line of flow between the feed inlet into the fluid distribution center and the feed inlet to the contact zone receiving said feed stream.

Other embodiments of the invention relating to specific charging stocks, specific sorbents, particularly arrangements of sorbent-containing zones and particular flow arrangements will be further referred to in the following description of the invention.

It is now widely recognized that various solid sorbents of specific composition and structure may be contacted with a mixture of compounds, the components of which differ in their relative sorbency on the solid, to thereby provide a means for segregating the individual components according to their structure. This type of separation procedure has been applied to mixtures of inorganic as well as organic compounds and has found one of its most frequent applications in the field of separating hydrocarbon mixtures containing components which differ as to their structural classes, being particularly applicable to the separation of mixtures which are relatively difficult to separate by other means of separation, such as distillation. The present process is applicable generally to problems involving absorption as well as adsorption of fluid streams on solids, being generically referred to as a "sorption" process, including separation procedures in which the mixture to be separated is contacted with a so-called "molecular sieve" which selectively "sorbs" the components of the mixture having a particular molecular structure or configuration. Adsorbents which selectively retain unsaturated compounds (such as olefinic and aromatic hydrocarbons) and organic compounds containing certain polar radicals and which retain these compounds by surface forces are typified, for example, by such adsorbent solids as dehydrated, activated silica gel, activated charcoal, the aluminum silicates and activated silica and alumina gels, such as the various clays, including such typical examples as Attapulgus clay, montmorillonite, dehydrated, synthetically prepared composites of alumina and silica, activated by heating to a temperature in the region of, but somewhat below the approximate fusion point of the composite, activated alumina, particularly gamma alumina, as well as other materials of similar character. Typical of the feed stock mixtures which may be separated by contact with a solid, activated adsorbent include, for example, paraffinic hydrocarbon fractions (such as a gasoline fraction) containing mercaptans and/or amines, the latter polar compounds being selectively retained on the adsorbent particles, mixtures of paraffins and olefins wherein the olefinic component is the component selectively adsorbed by the solid adsorbent, mixtures of aromatic and non-aromatic hydrocarbons wherein the aromatic constituent is selectively adsorbed by the solid adsorbent, mixtures of water vapor and an inert gas, such as nitrogen or air containing moisture (the moisture being selectively adsorbed), mixtures of phenols and/or sulfur compounds such as thiophene with liquid hydrocarbons, the phenolic or sulfur compound being selectively adsorbed, and in numerous other applications, well-known in the chemical arts and referred to generally in the aforementioned U.S. Patent No. 2,985,589 issued to Donald B. Broughton et al. of which the present invention is an improvement.

The present process improvement is applied with advantage to all separation processes utilizing a solid sorbent capable of selectively retaining at least one class of components present in a feed stock mixture comprising multiple components, including at least one which is relatively less selectively sorbed and capable, further, of having its sorbency restored by treatment of the "spent" sorbent in a downstream portion of the process flow with a desorbent. The method, however, is particularly applicable to separations utilizing sorbents which are relatively unstable structurally and which therefore do not permit removal of the solid sorbent from one functional stage of the process flow, such as the adsorption zone, to another stage of the process, such as the desorption zone without suffering a loss of its activity and usefulness because of attrition or other consequences of its structural instability. For purposes of this description and for expressing the generic concepts of this invention, the various methods of separation, whether such methods involve clathration, adsorption, absorption, occlusion or ionic exchange, will be referred to herein as "sorption," and the use of the latter term herein is intended to include such types of separation generally utilizing a solid contacting agent.

The present process is also herein characterized as a "cyclic" and "continuous" process. It is thereby intended to define a method in which the various inlet and outlet streams are charged and withdrawn, respectively, in a continuous manner, without interruption, with respect to either the flow rate or composition of the several streams, the bed of solid sorbent remaining in substantially fixed position within the sorption column, and the feed and desorbent inlets and the product withdrawal outlets being shifted substantially simultaneously in a downstream direction and in equal, unidirectional advances.

In accordance with the flow arrangement provided in the process described in U.S. Patent No. 2,985,589, of which the present invention is an improvement in the mass of sorbent particles, although stationary in one or more fixed beds, nevertheless effectively acquires simulated countercurrent movement relative to the fluid stream which flows through the stationary bed(s) as a result of advancing the feed inlets and product outlets into and from the fixed mass of sorbent particles along the line of fluid flow which thereby assumes a continuously cyclic pattern; thus, from a bed which is at all times downstream with respect to the feed stock inlet; the mass of stationary sorbent particles between the feed stock inlet and raffinate outlet is referred to herein as the "sorption" zone in which the sorbate component of the feed stock mixture is retained.

The present process may also be visualized as being effected in a series of four, interconnected zones of a single fixed bed of solid sorbent having no actual line of demarcation between each of the zones other than the zone boundaries defined by the points of inlet and withdrawal for the various fluid streams. The feed stock inlet of the sorption zone establishes a point of reference relative to which all other points in the bed of sorbent are conveniently designated. The next downstream zone is referred to as a "primary rectification" zone; the next adjacent downstream zone is referred to as a "desorption" zone; and a "secondary rectification" zone. The term "upstream" and "downstream" are interpreted herein in their ordinary and usual definition in the chemical process arts; that is, the term "downstream" refers to an advanced point in the direction of flow relative to the point of reference, whereas "upstream" refers to a retrospective point in the direction of fluid flow. The contacting column, when in the form of a continuous bed, is relatively elongated compared to its width and is more preferably a long, slender bed. The preferred form of the fluid solid contact zone designated herein, is divided into a series of compartments or "beds" with a substantially reduced constriction between each compartment, the constriction, however, also containing sorbent particles. The latter particularly preferred arrangement is shown in the accompanying diagrams, hereinafter more fully described. The advantages of constricting the width of the bed at the entry and withdrawal points of the various streams are: (1) prevention of convective backmixing of fluid in a direction opposite to the direction of continuous fluid flow, and (2) greater ease of distributing fluids flowing into and out of the contacting column because of the ability to thereby eliminate channeling and other undesirable loss of uniform distribution.

Suitable charging stocks which may be utilized in the process of this invention are characterized as containing a mixture of two or more compounds, one of which (referred to as "sorbate") is sorbed with relatively greater tenacity on a solid sorbent than one or more other components (referred to as "raffinate") present in the feed stock. In view of the applicability of the present process to various types of adsorptions, including surface adsorption, clathrate formation, and molecular occlusion, as described in the aforementioned U.S. Patent No. 2,985,589, any mixture of organic compounds having sorbate and raffinate components may be employed herein as feed stock.

The process of treating a mixed feed stock of inorganic or organic composition and the process flow which provides the continuous method of treatment provided by the present invention is further illustrated in the accompanying diagram. The separation process to which the accompanying diagram relates is described by reference to a particular arrangement of multiple beds or zones of stationary particles of sorbent and to a process in which the fluid stream is a liquid, but it will be understood that other arrangements of sorbent beds, vapor or gaseous phase operation and the use of other types of equipment are also contemplated within the broad scope of the present invention.

Although the solid sorbent is described as being distributed in a "plurality of fixed beds," it is obvious that the series of interconnecting zones actually constitute a continuous, vertical bed having interconnecting conduits of reduced cross-sectional area, which also contain sorbent, between the adjacent, so-called "beds." A fluid pump is provided between at least one pair or adjacent beds to provide a positive, unidirectional (downstream) flow of fluid stream through the stationary mass of solid sorbent particles.

The feed stock enters one end of one of the serially arranged, fixed beds of sorbent, the non-sorbed raffinate portion of the fluid feed stock (i.e., the residue of feed stock remaining after sorption of at least a portion of the selectively sorbed material (sorbate) in the first bed of the sorption section of the process) leaving the opposite end of the first bed in the sorption section and thereafter enters the inlet of the next adjacent downstream bed in the sorption zone, which similarly contains a fixed mass of solid sorbent particles. A sufficient number of such fixed beds (although not necessarily exceeding one in number, but of sufficient length and capacity to accommodate all of the sorbate entering the sorption zone during the time that each bed is on stream) in contiguous, interconnecting relationship are provided to substantially completely remove the sorbate from the influent feed stock and to provide a substantially pure raffinate product effluent issuing from the outlet of the last bed in the series of beds which comprise the sorption zone of the process flow. In the case of some feed stocks and some sorbents, only one bed is required to effect such separation, while in other cases, a series of two or more beds (generally not more than about ten beds in series) are required, the number depending upon the length of the series in the aggregate, the sorptiveness of the sorbate component, the depth of sorbent in each bed, the sorptive efficiency, and numerous other factors involved in the process. The outlet from the last fixed bed of the series of beds in the sorption section contains an outlet port through which a portion of the raffinate product is withdrawn. The remaining portion of the raffinate effluent from the sorption zone continues to flow through one or more interconnecting downstream beds which constitute, in the aggregate, the "primary rectification stage" of the process. The stream which flows from the downstream outlet of the primary rectification zone is interstitial fluid hydrodynamically displaced from void spaces between the particles of solid sorbent and, therefore, flows from the downstream outlet at the same rate that primary reflux enters the primary rectification zone. The effluent stream is joined at the outlet of the last bed in the series comprising the primary rectification zone by an inlet stream of desorbent flowing in the same downstream direction as the effluent interstitial fluid.

The desorbent is a material which is capable of displacing sorbate component of the feed stock already sorbed on the solid sorbent when the beds now comprising the desorption zone were in the sorption zone of a previous cycle of operation, the stream flowing through the successive beds of the desorption zone thus comprising a mixture of desorbent and desorbed sorbate released from an upstream bed of sorbent. The displacing action of the desorbent is primarily a Mass Action effect, the desorbent being charged in sufficient quantity to provide a molar ratio of desorbent (in the interstitial void spaces) to sorbate (within the pores of the sorbent) at any given point in the desorption zone at least greater than 1 to 1, the desorbent rate of flow preferably being sufficient to provide a molar ratio of at least 10 to 1, up to about 30 to 1 moles of desorbent per mole of sorbate in the desorption effluent stream. The raffinate remaining in the effluent stream leaving the sorption section of the process, being non-sorbed, tends to occupy the void spaces between particles of sorbent and thus tends to become "lost" in the first one or more beds of the primary rectification section. As the mixed stream of remaining desorbent and sorbate flows through the desorption zone of the process flow, it becomes progressively enriched with sorbate, the desorbent releasing additional sorbate in its continuing flow, taking the place of the displaced sorbate in the pores of the sorbent. At some more distant point in the downstream direction of flow, near the end of the desorption zone, a stream comprising a mixture of sorbate and desorbent is withdrawn as desorption zone effluent and discharged from the cycle of operation as ultimate product or as intermediate feed stock for further purification, if desired. This stream may be fractionated (for example, in an auxiliary distillation unit) to separate the desorbent from a relatively pure sorbate product. The remaining portion of desorbent and sorbate not removed through the sorbate product outlet continues its downstream direction of flow into the next bed or portion of the mass of sorbent particles comprising the secondary rectification zone wherein the interstitial raffinate is washed from the sorbent and out of the voids between the particles of sorbent by a stream of secondary reflux comprising the desorbent-sorbate mixture. The fluid displaced from the interstitial void spaces in the last downstream portion of the rectification zone combines with the incoming feed stock at the inlet of the sorption zone, thereby completing one cycle of operation. The composition of this stream flowing from the outlet of the secondary rectification zone is almost entirely feed stock, being the interstitial fluid left in the void spaces of this bed when feed stock entered it prior to the last advance in feed inlets and product outlets into and from the cyclic process flow.

During the course of the above continuous process of sorption and desorption, the point of introduction of feed stock and desorbent in the cycle and the points of removing non-sorbed or raffinate component of the feed stock as well as the selectively sorbed or sorbate component are either periodically or continuously shifted to a downstream sorbent bed, each of the indicated points of entry and points of withdrawal being shifted an equal aliquot portion of the total number of beds in a downstream direction with respect to the position of these points at an increment of time prior to the shift. Thus, the point of introducing feed stock into the process flow ultimately arrives at the point in the cycle of operation where sorbate component was removed in a preceeding stage of the process, one circuit in the cycle of operation then having been completed.

In addition to the contacting column containing the mass of solid sorbent particles, one of the essential components of apparatus involved in the process is a means of distributing the various fluid inlet and outlet streams into and from the separate functional zones of the sorbent bed(s) and for advancing the points of inlet and outlet through the serially arranged zones of the process flow. Thus, each bed of the mass of sorbent is connected by a conduit or line to an external fluid distribution center which directs the one or more streams into or out of the mass of sorbent particles, depending upon the particular stage of the process in which the mass of sorbent particles is involved, as determined by a prearranged program under which the distributing center operates. At any given instant during the process cycle, one bed receives feed stock from the distributing center through lines and valves connecting the inlet of the bed to the distributing center. A bed serially connected immediately or through a number of intermediate beds further downstream (in the direction of fluid flow) contains an outlet port through which non-sorbed component of the feed mixture is withdrawn, the withdrawal being effected through connecting lines, valves, and other equipment through the distributing center. A bed further downstream (in immediate serial location or following several intermediate beds) is connected through lines, valves, etc. with the distributing center which also supplies a stream of desorbent to the next serially downstream "desorption" section of the process flow. After one or more serially interconnected beds comprising the desorption section, the sorbate (selectively sorbed component of the feed stock) displaced from the sorbent by the desorbent is removed through an outlet port, connecting lines, etc., through the distributing center to an external separation or storage facility. The one or more serially arranged, downstream beds following the sorbate outlet constitute a refluxing or rectifying zone wherein the last stages of product purification occur, the cycle thereafter arriving at the point of beginning or the point at which feed stock is charged into the process flow. A fluid transfer pump is provided between any two adjacent beds in the series to increase the fluid pressure on the downstream discharge side of the pump, thereby maintaining the flow of fluid under positive pressure head and also thereby maintaining the cyclic flow on a continuous basis. After a predetermined period of operation in which the streams are continuously charged and withdrawn as hereinabove indicated, the respective inlet and outlet ports are advanced in a downstream direction to the next adjacent bed in series, the shift being accomplished by opening and closing the appropriate valves in each of the lines connecting the beds of sorbent to the fluid distribution center. It is evident that the lines and portions of the equipment which last carried feed stock to the last preceding upstream bed (i.e., just prior to the shift) still contain the feed stock mixture, and when the line connecting such bed to the distributing center is next utilized to convey sorbate component to the distributing center, following the rectification or refluxing zone, the residual feed stock thus present in the lines, valves and other equipment contaminates the purity of the sorbate stream removed from the separation column through such lines and fluid distribution equipment. Thus, the sorbate product outlet continuously follows at an upstream distance the feed stock inlet and if the process is operated in accordance with the flow arrangement described in U.S. Patent No. 2,985,589, the sorbate product at all times becomes contaminated with the feed stock in the lines and fluid distribution equipment carrying these streams into and from the process flow, since no fluid stream intervenes between the feed stock inlet and sorbate product outlet when the process is operated by the method disclosed in said prior U.S. patent.

In accordance with the process of the present invention, however, a flush stream which does intervene between the feed stock inlet and the sorbate product outlet is provided in the form of a flush stream inlet; thereby, the lines and equipment last previously carrying feed stock to the separation column are flushed, immediately after the shift of the inlet and outlet ports to the next serially located downstream bed, with a purge stream in sufficient volume to free such lines and equipment of the feed stock present therein so that when such line carries the sorbate stream after a subsequent shift of the inlets and outlets, the sorbate becomes mixed merely with the purge stream from which the sorbate is readily separated by distillation or other means of fractionation. The purge stream utilizable for this purpose may be a normally gaseous material, such as nitrogen, carbon monoxide, carbon dioxide, methane, ethane, propane, the desorbent utilized in the process (normally a material which is readily separated from the sorbate product), an internal recycle stream of sorbate (since sorbate will next be withdrawn through these lines and equipment or a liquid boiling substantially above or below the boiling point or boiling range of the feed stock. These materials suitable as the source of flush stream are referred to herein as materials separable from the feed stock.

The manner of operating the present process employing the improvement of the present invention and a suitable apparatus for effecting such operation is illustrated in the accompanying diagram.

Any suitable apparatus comprising a series of fixed beds or one, single continuous bed of sorbent, if desired, having fluid-flow connecting means between the outlet of one bed and the inlet of its next adjacent bed and comprising a suitable means, such as a valve or a manifold and valves for shifting the points of inlet and outlet for the various feed and product streams involved in the process may be provided. The accompanying diagram illustrates one of the preferred types of apparatus, being particularly suitable because of the compact arrangement of the series of fixed beds in superadjacent and subadjacent relationship to each other. The separation zone contains at least 4 serially arranged, separate beds interconnected by a pipe between the bottom of one bed to the top of its downstream adjacent bed, or the beds may be stacked one upon another, within a suitable vertical column, as illustrated in FIGURE 1 of the accompanying diagram, herein referred to in its entirety as contacting column 101 containing suitably shaped partitioning means which divide the vertical column into a series of adjacent contacting zones, such as zones 1' to 12', each zone being divided from its adjacent contacting zones (except the uppermost and lowermost zones) by a funnel-shaped partitioning member such as partition 102 in contacting zone 1', having a downcomer 103 of restricted cross-sectional area opening into a subadjacent contacting zone 2' through a transverse partitioning member 104 which comprises the upper boundary of the subadjacent contacting zone 2'. The flow of fluid through the series of beds is illustrated as downflow, but upflow is also operable and may be preferred. When utilizing an upflow process, the discharge side of pump is connected to the bottom of column 101, instead of the top of the column.

An essential portion of the present apparatus, essential, that is, to the realization of the type of flow provided by the present method of operation, is the provision of a suitable programming device for changing the points of inlet and outlet into and from the contacting column and for advancing each of these either intermittently or constantly in equal increments and in a downstream direction during the operation of the process. Any suitable form of fluid distributing center, such as a manifold arrangement of valves and incoming and outgoing lines may be provided with timed, electrically operated switches to open and close the appropriate valves. The programming principle may also be suitably effected by means of a plug valve of particular design, illustrated in the accompanying diagrams, which depict a circular valve 105 having a valve housing A and a continuously revolving plug B rotatable in said housing A in fluid sealed relationship with the housing A. Another suitable design of the fluid distribution center especially suitable for incorporation into the present process flow as a fluid distribution center is shown in U.S. Patent No. 3,040,777, issued to D. B. Carson et al.

In valve 105 the valve housing contains a number of inlet and outlet ports: 1 to 12 connected in fluid flow relationship with internal passageways inside the valve plug through which certain inlet and outlet fluid streams, hereinafter described, enter and are withdrawn from fixed beds in contacting column 101. The valve plug is arranged to provide at least 4 passageways to accommodate at least two separate inlet streams and at least two separate outlet streams, the two inlet passageways alternating with the two outlet passageways.

Figure 2:
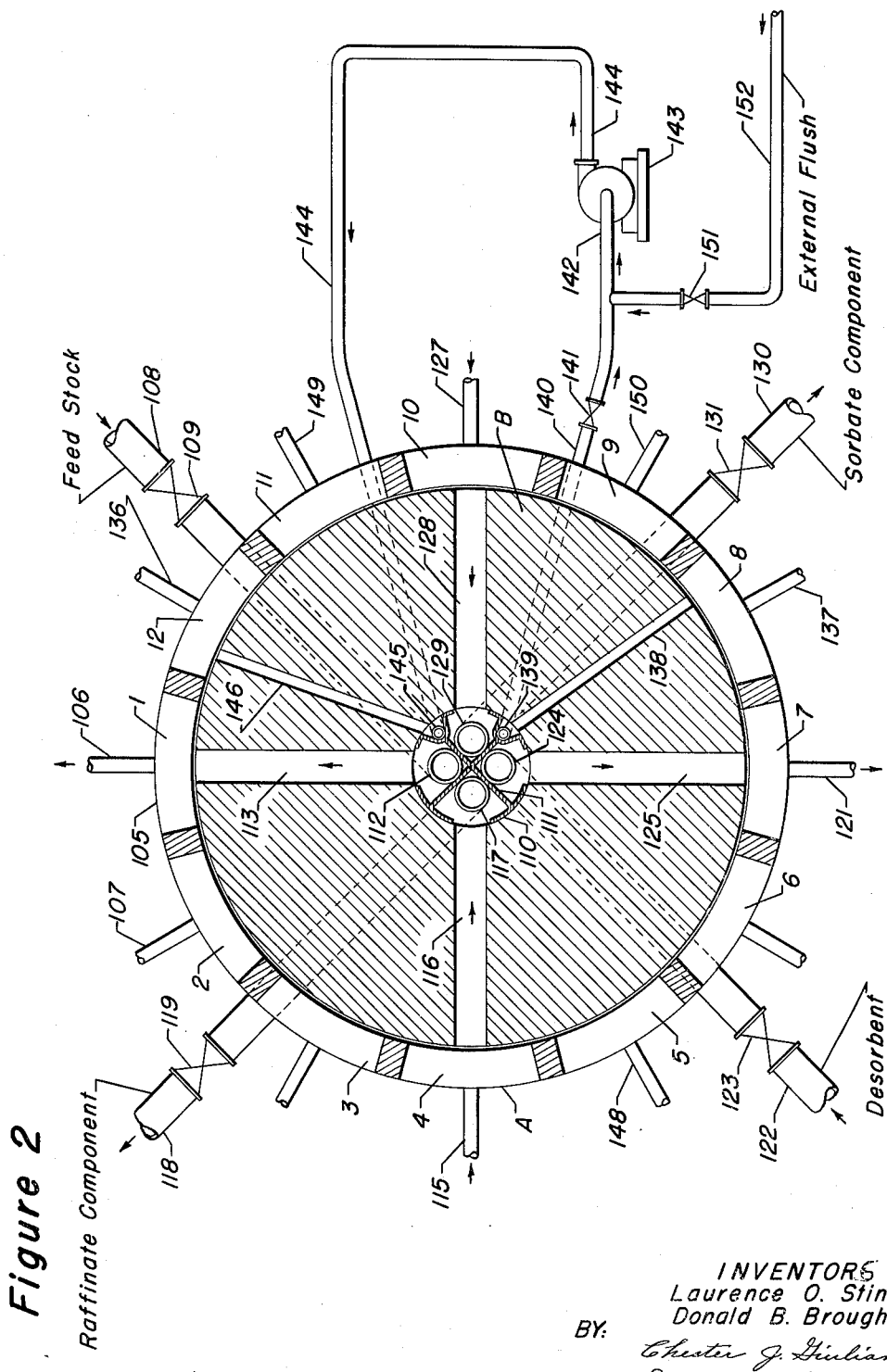

FIGURE 2 is a cross-sectional view of the valve shown in FIGURE 1, illustrating the internal conduits required in the valve plug for conveying a small, so-called slip stream of desorbent from a bed containing fluid rich in desorbent through the valve, into those lines which last previously carried feed stock, thereby flushing the latter of residual feed stock.

Port 1 in valve housing A provides an opening through which fluid streams are carried into or from valve plug B through line 106 connecting port 1 in the valve housing with the top of contacting zone 1'. Similarly, port 2 in the valve housing connects the port in the valve with line 107 which connects with downcomer 103 between contacting zones 1' and 2' of column 101. Since, however, no internal passageway in plug B opens into zone 2' (i.e., in the position of the plug illustrated in FIGURES 1 and 2) and the solid portion of plug B blocks port 2 in fluid-sealed relationship thereto, no fluid flows through port 2 into line 107. In the same manner, ports 3 to 12 in the valve housing connect with their corresponding contacting zones 3' to 12' through a connecting conduit, which may at any particular position of the valve plug be open or closed to one of the several inlet or outlet streams flowing in the process, as hereinafter more fully described.

For the purpose of simplifying the description of the process and apparatus involved in the present invention, the method of operating the present process and the means by which the components of the mixed feed stock are separated will be described by reference to a particular feed stock comprising a mixture of normal and isoparaffins, such as a mixture of normal and isohexanes, a mixture, particularly difficult to separate by simple fractional distillation. In thus specifying a particular mixture of hydrocarbons as a typical feed stock, however, it is not thereby intended to limit the present process to such feed stocks or even to hydrocarbon mixtures, the method nevertheless being applicable to any mixture of organic or inorganic components within the broad scope hereinbefore indicated. For such a separation as the indicated resolution of mixed normal and branched chain hexane isomers, the solid sorbent in each of the sorption zones 1' to 12' in column 101 is a "molecular sieve" of the type comprising discrete, generally loosely held together porous particles of an alkali metal or alkaline earth metal aluminosilicate, containing pores of from 4 to about 5 Angstrom units in cross-sectional diameter, described in articles by Breck et al. and Reed et al. appearing on pp. 5963–5977 of the Journal of the American Chemical Society, Vol. 78, for December 8, 1956, and in U.S. Patent No. 2,306,610 issued to Barrer. The mass of sorbent particles is randomly distributed in each bed and contains void spaces or interstitial spaces distributed throughout the bed, between the particles packed into each of the beds.

Referring to FIGURES 1 and 2, in starting the process, a feed stock such as the indicated mixture of hexane (normal, cyclo and/or isohexanes) which is desirably separated into a pure stream of the normal component and a stream of the mixed iso and/or cyclic components free of normal hexane, is charged into the process flow through line 108 in amounts controlled by valve 109, the feed stock flowing through line 108 into the central axle 110 of the rotary plug valve which is divided into four compartments by the divider member 111, line 108 discharging the feed stock mixture through orifice 112 in the hollow axle, into internal passageway 113 connecting with outlet port 1 in housing A. The stream flowing through port 1 enters line 106, which in turn, connects with line 134 conveying recycle fluid from the bottom of the contacting column (zone 12') to the upper end of contacting zone 1'. The fluid stream in line 134 flows into contacting zone 1' in a downstream direction of flow, that is, toward contacting zone 2'. The molecular sieve sorbent in each of the contacting zones selectively retains the normal paraffinic component of the feed stock and selectively excludes the isoparaffinic and cycloparaffinic components because the size of the pore openings in the sorbent permit the more slender straight chain molecules (such as n-hexane) in the feed stock to enter the pores but do not permit the molecules of larger cross-section (such as isohexanes and cyclohexane) to enter the pore openings, the latter raffinate-type components of the feed stock continuing to pass through the bed of sorbent, through downcomer 103 into bed 2'. Any remaining n-hexane component in the stream leaving zone 1', particularly as the sorbent in zone 1' becomes spent with sorbed component, continues to flow through zone 1' into subadjacent contacting zone 2', the latter bed of solid sorbent removing an additional quantum of residual normal paraffins remaining in the effluent from the preceding or superadjacent contacting zone, if present.

In general, a sufficient number of interconnecting fixed beds in series, each containing solid sorbent, or a continuous bed of sufficient length, are provided to supply sufficient sorbent capacity to remove all of the normal component of the feed stock and leave only iso or branched chain and cyclic feed stock components remaining in the effluent stream from the last bed of the "sorption zone." This may require only one bed or a number of beds in series, a shallow bed, or a bed of considerable depth, depending upon the efficacy of the sorbent and the sorbability of the feed stock components, which varies according to the composition of the feed stock.

When a normal paraffin, such as n-hexane of the present illustration is the sorbate component of the feed stock, the desorbent utilized in the process is desirably a normal paraffin of lower or higher molecular weight which differs from the sorbate component(s) by at least 2 carbon atoms, such as n-butane of the present illustration. Thus, n-butane displaces sorbed n-hexane from the pores of the molecular sieve and is itself sorbed into the pores of the sorbent particles when it is present in the interstices surrounding the sorbate-containing molecular sieves in molar excess compared to the number of moles of n-hexane sorbed on the molecular sieve particles, unless the desorption zone is operated at an elevated temperature relative to the sorption zone, in which case, hot desorbent is capable of effecting desorption at less than equi-molar ratios of desorbent to sorbate. Since n-butane is present in the recycle, pump-around stream entering bed 1' through line 134 with the feed stock, it occupies the pores of the sorbent which are not preferentially occupied by the n-hexane component present in the feed stock and thus, any excess sorbent in bed 1' and subsequent beds 2', etc. comprising the sorption zone of the contacting column, retains the n-butane carrier fluid, leaving isohexane and/or cyclohexane to occupy the interstitial spaces between the particles of sorbent. However, as more feed stock mixture continues to flow into bed 1', prior to completion of the shift of the feed stock inlet to bed 2', the incoming, preferentially sorbed n-hexane displaces n-butane from the pores of the molecular sieve sorbent, the displaced n-butane joining the non-sorbed cyclohexane and/or isohexanes present in the feed stock, the resulting mixture continuing its flow into the downstream beds of sorbent.

According to the design requirements of the process flow, one of the downstream contacting beds (such as bed 3' in FIGURE 1), is the last bed in the series of beds comprising the sorption zone of the column, and the effluent stream leaving bed 3' is essentially pure raffinate components consisting of cyclohexane and/or isohexane in admixture with displaced desorbent (n-butane, from which the hexane raffinate components are readily separated by distillation). After the fluid stream has passed through contacting bed 3', through downcomer 114 (being prevented from flowing through any intermediate outlet conduits, such as line 107 because of blockage of outlet ports 2 and 3 by the solid portion of plug B in valve 105), at least a portion of the fluid raffinate stream flows into line 115 connected with port 4, which is the first port available in the fluid distribution center 105 as an outlet port. The raffinate stream thus removed from the process through line 115 is conveyed into valve 105 through port 4 connecting with internal outlet passageway 116 in plug B of valve 105, and thereafter leaves the process flow through orifice 117, in valve axle 110, into raffinate outlet conduit 118 in amounts controlled by valve 119. The amount of effluent thus removed from contacting column 101 through the raffinate outlet is carefully controlled by valve 119 to provide a residue of raffinate mixture in column 101 which flows past outlet conduit 115 into subadjacent or downstream contacting bed 4', the first of three beds comprising the primary rectification zone of contacting column 101. The quantity of non-withdrawn portion of the fluid effluent of bed 3' is a fixed proportion of the total fluid effluent of bed 3', but is preferably at least 20 percent by volume of the aggregate interstitial void space in bed 4' and more preferably flows into the first bed between the outlet of the sorption zone and the inlet of the desorption zone at a rate of from 80 to less than 100 percent of said aggregate interstitial void space volume in bed 4'. The fluid flow rate required to displace completely (i.e., 100 percent) the aggregate interstitial void volume in each bed outlets of the column (said volume being equal for all beds in the contacting column, since the beds are of equal size and are packed with substantially the same volume of sorbent) is herein referred to as "balanced reflux." This process control variable is a volumetric rate of flow factor, being that flow rate which will just replace 100 percent of the interstitial volume in each bed during the time that each bed is on stream with fluid of the same composition and the on-stream time for each bed is that aliquot portion of the total cycle time divided by the number of beds (or the number of fluid inlet points when the number of beds does not correspond to the number of feed stock inlets per cycle). Thus, primary reflux flow rate is specified herein as being from 20 to 100 percent of balanced reflux, and more preferably from 80 to 95 percent of balanced reflux. As the primary reflux stream flows through the downstream beds of sorbent (that is, through bed 4′ and succeeding beds), desorbent n-butane occupies the internal pores of the solid sorbent and the isohexane and/or cyclohexane raffinate components of the feed stock residue occupy the interstitial spaces or voids between the particles of solid sorbent.

It will be noted that the raffinate components of the fluid stream flowing successively through the series of beds of sorbent and which tends to occupy the spaces between the particles of sorbent, will also tend to be the last component to be swept from the succeeding beds of sorbent and thus will not generally be present in the downstream beds following the point of withdrawal of raffinate from the process flow. Accordingly, in the stage of the process provided in the present illustration (that is, in which feed stock is currently charged into the inlet of bed 1′), the branched chain and cyclic hexane components present in the residual portion of the fluid stream which bypasses raffinate withdrawal line 115, will tend to be concentrated in bed 4′, much less will be present in bed 5′ and substantially none, if any, will be present in bed 6′. As the position of the inlet and outlet points change by rotation of plug B in valve 105, the downstream beds following the point of raffinate withdrawal will be constantly substantially free of raffinate: consequently, raffinate does not contaminate the stream of circulating fluid beyond the first to third or, at most, the fourth downstream bed beyond the bed from which raffinate is withdrawn (line 115 in the illustration). For similar reasons, the stream flowing from the raffinate outlet will be substantially pure raffinate, since the raffinate components tend to lag behind the downstream fluid front and thus selectively fractionate in the beds from which the raffinate stream is currently withdrawn.

The series of beds between the point of raffinate withdrawal and the point of desorbent inlet, as hereinafter described, is a zone wherein the components of the fluid stream rearrange themselves in the intervening beds of sorbent to effect the foregoing relative distribution of the branched chain and cyclic hexane components in the sorbent beds. This portion of the series of beds, that is, the beds immediately following the point of raffinate withdrawal, is referred to in the present process flow as the "primary rectification" zone, which characterizes such re-distribution of fluid components in the residual raffinate stream.

At some further downstream point in the series of sorbent beds: that is, at the outlet downcomer of one of the beds in the series 4′, 5′, etc., such as, downcomer 120, which is the fluid outlet from bed 6′ and the fluid inlet of bed 7′, a stream of desorbent is charged into contacting column 101, thereby joining the fluid stream leaving bed 6′. Desorbent charged into the process flow through line 122 in amounts controlled by valve 123 and at a pressure exceeding the fluid pressure in column 101 at downcomer 120, thereafter flowing from line 122 into internal passageway 125, through orifice 124 in the hollow axle of plug B of valve 105, through inlet port 7 in the housing of valve 105, and thereafter into line 121 which connects with downcomer 120 feeding the desorbent into bed 7′.

The flow rate of desorbent thus admitted into the process flow is sufficient to displace from the pores of the molecular sieve sorbent the n-hexane component previously sorbed from the feed stock in a preceding stage of the cycle of operation when bed 7′ was the first of the series of beds comprising the sorption zone. In order to effect such displacement, the n-butane desorbent must surround the spent sorbent in the spaces between the particles of sorbent, and must be present in an amount sufficient to cause a transfer of n-hexane sorbate from the spent sorbent into the perfluent n-butane. The flow rate of n-butane desorbent required to effect this result is generally from about 5 to 1 to about 15 to 1 molar ratios of desorbent to sorbed straight chain component of the feed stock occupying the pores of the sorbent as sorbate, preferably, in the example at hand, from about 3 to 1 to about 10 to 1 moles of n-butane per mole of sorbed n-hexane. In the case of other feed stocks and for other systems of separation, utilizing other sorbents, feed stocks and desorbents, the molar ratio of desorbent to sorbate is generally in the range of from about 2 to 1 to about 30 to 1 moles of desorbent per mole of sorbate in the feed stock.

The mixture of desorbent (n-butane) and displaced feed stock normal paraffin (n-hexane) which is formed as a result of the displacement of n-hexane from the spent sorbent by n-butane and occupancy of the sorbent by the n-butane, flows from zone 7′ into beds 8′ and 9′ by virtue of the positive pressure head between upstream and downstream beds, through the interconnecting conduits (downcomers) between the succeeding zones in series, ultimately flowing into downcomer 126 having outlet conduit 127 connected therewith. The outlet provided by conduit 127 for the mixture of n-butane desorbent and released n-hexane sorbate is the first fluid outlet from the series of beds following the raffinate outlet conduit 115 from which the fluid mixture comprising the desorbent and displaced n-hexane can be withdrawn, all other escape outlets through the valve being blocked by the solid portions of plug B of valve 105.

The fluid stream leaving bed 9′ of contacting column 101 flows through outlet port 10 in housing A of valve 105 by virtue of the pressure differential between the fluid in downcomer 126 and the fluid in outlet port 10, the fluid consequently flowing through port 10 into internal passageway 128 of valve plug B, through orifice 129 in the stem 110 of valve 105, and through conduit 130 and valve 131 into storage or additional processing equipment, not illustrated, for separation of desorbent (for recycle, if desired) from n-hexane or for use of the resulting mixture, if desired.

The desorbate effluent (a mixture of excess desorbent and desorbed sorbate component) arriving at the outlet downcomer of the desorption zone extending downwardly from bed 9′ is partially withdrawn from downcomer 126 for removal as the sorbate product stream from the process flow through line 127 and the remaining non-withdrawn portion of the desorption effluent bypasses the sorbate product outlet into line 127 and continues to flow into the next adjacent downstream contacting zone 10′ as the secondary reflux stream referred to herein. The series of beds beyond the point of sorbate withdrawal (through downcomer 126 and line 127) and is referred to herein as as "secondary rectification" zone of the process flow. In the illustration of a typical separation process shown in FIGURE 1 hereof, beds 10′ through 12′, inclusive, constitute the series of beds at the current stage of the cycle which functions as the secondary rectification zone. The flow rate of secondary reflux into the secondary rectification zone, just as the flow rate of primary reflux, is a process control variable of substantial importance in the present process for the attainment of high product purities. In the case of the primary reflux stream, the flow rate of this stream into the first downstream bed of the primary rectification zone was specified at less than balanced reflux to thereby prevent raffinate comprising the primary reflux from entering the further downstream desorption zone from which it would be withdrawn with the sorbate product as an undesirable sorbate contaminant if the primary reflux flow rate exceeds 100 percent of balanced reflux. In the case of the secondary reflux flow rate, however, the flow rate of this stream from the outlet of the desorption zone into the secondary rectification zone is desirably maintained at a rate somewhat greater than balanced reflux (as hereinabove defined), preferably from 100 to 160 percent and more preferably from 110 to 140 percent of balanced reflux. At this rate, secondary reflux spills over into the sorption zone before the inlets and outlets of streams flowing into and from the contacting column have advanced to the next adjacent downstream inlet or outlet. Thereby, the interstitial fluid in the bed last previously receiving feed stock (i.e., the first adjacent upstream bed) is replaced by secondary reflux and feed stock formerly occupying the interstitial spaces is replaced by primary reflux fluid which will next be withdrawn from the rectified beds following the next advance of inlets and outlets in the process cycle. This expedient permits the recovery of products of substantially greater purity and displaces feed stock from the void spaces of the first upstream bed into the sorption zone, thereby increasing over-all product recoveries from a given quantity of feed stock.

The effluent of bed 12' at the current stage of the cycle and utilizing the example herein comprises predominantly n-butane displaced by the sorbate component in the secondary reflux stream entering bed 10' acts in the capacity of a continuous carrier fluid flowing from the outlet of bed 12' through downcomer 132 into line 134 for recycle to the inlet of contacting zone 1'. In order to provide a positive pressure differential between the inlet to the next downstream bed of sorbent and the outlet of the last upstream bed of sorbent it must be given an incremental increase in pressure to enter bed 1'. For this purpose, the fluid stream is withdrawn from downcomer 132 of contacting zone 12' and transferred at a higher pressure by means of pump 133 into line 134 containing valve 135 which controls the flow of the continuously circulating pump-around stream into the top of contacting bed 1' to provide a continuously cyclic flow of fluid in the process cycle. Such continuously cyclic unidirectional flow of the fluid phase through the successive series of functional zones comprising the process flow is an essential process factor for the maintenance of equilibrium between the solid sorbent and fluid streams contacted therewith.

It will be apparent that each of the operations hereinabove described occur substantially simultaneously as plug B of valve 105 is continuously rotated in a counterclockwise direction and that at any given instant of time thereafter, each bed becomes progressively a more downstream bed with respect to the fluid stream continuously flowing through the series of beds. Thus, if at any given instant, bed or contacting zone 1' is the point which first contacts fresh feed introduced into the process, at a given point of time thereafter, following a sufficient interval to permit the plug in valve 105 to complete $\frac{1}{12}$ of its rotation, zone 2' becomes the point of first contact with the feed stock and zone 1' is the last preceding (or first upstream) bed in the series of beds through which feed stock was charged in the last preceding stage of the process. Thereafter, zones 2' through 12' become, successively, the beds first contacted with feed stock and all other beds in the cycle successively become beds of first contact for other functional stages of the process, each stage and each bed maintaining their relative spatial relationship to the other stages and to the other beds in the cycle. Thus, it will be noted that as the feed inlet continuously shifts, the raffinate outlet, desorbent inlet and sorbate outlet also shift in the same aliquot proportion of the total cycle and as these points shift, the composition of the fluid stream at different points and the composition of the fluid in the sorbent beds also changes. Thus, the raffinate component occupies the voids between sorbent particles only in those beds on either side of the raffinate outlet. Similarly, n-hexane sorbate is present within the pores of the solid sorbent occupying beds relatively upstream from the raffinate outlet so that the fluid stream reaching the bed which is the raffinate outlet in the continuously shifting point of raffinate withdrawal is essentially pure raffinate (isohexane and/or cyclohexane) components in admixture with n-butane desorbent and the fluid stream reaching the bed which is the sorbate outlet (also a continuously shifting point of withdrawal) is essentially pure sorbate (n-hexane) in admixture with n-butane desorbent.

In the manner of operating the process as hereinabove described, the product (sorbate and raffinate) outlet streams are contaminated to the extent resulting from the residual fluid stream remaining in the lines leading from the contacting column to the valve port in the fluid distribution center (valve 105) of a preceding portion of the cycle of operation. The raffinate product stream becomes mixed with the residue of desorbent left in the lines and fluid distribution equipment between valve 105 and the contacting column. The sorbate product stream becomes mixed with the residue of feed stock left in the lines and fluid distribution equipment between valve 105 and contacting column 101. The small amount of desorbent in the raffinate product stream may be readily separated therefrom by fractional distillation of the raffinate product, providing a substantially pure raffinate product. In the case of the sorbate product stream however, in which the contaminant is residual feed stock left in the aforementioned lines and equipment, the raffinate component of the contaminating feed stock is generally not separable from the sorbate because its boiling point is too close to the sorbate to be separated therefrom by distillation or by means other than sorption. In accordance with the process herein provided, comprising the improvement over the process of U.S. Patent No. 2,985,589, sorbate product is recovered in a state of substantially increased purity by flushing the lines and equipment last previously carrying feed stock with a material readily separable from the sorbate product, utilizing as the source of the flush stream a small slip stream of desorbent, a portion of the sorbate product stream or other material referred to generally herein as a material separable from the feed stock which includes the foregoing types of flush fluids.

The manner of modifying the process of U.S. Patent 2,985,589 in accordance with the present improvement and a suitable arrangement of equipment for accomplishing the desired objects of this invention are shown in FIGURES 1 and 2 of the accompanying diagrams, which illustrate the embodiments of this invention. Essentially, the present improvement comprises introducing a flush stream derived internally from a small slip stream of desorbent or the sorbate component or externally from a source of other fluid separable from the feed stock and charging the flush stream into a part of the fluid distribution center which connects with the lines and other equipment which last previously carried feed stock into the contacting column; that is, the lines and equipment carrying feed stock to the first upstream bed relative to the current feed stock inlet. The accompanying diagram represents the position of the rotary valve plug when feed stock is charged into contacting column 101 through line 106, the feed stock entering bed 1' of the column. The line last previously carrying feed stock when the rotary plug was backed up $\frac{1}{12}$ of its complete cycle of rotation and feed stock entered column 101 through line 136 into bed 12'. Line 136, part 12 in valve 105, therefore constitute the portions of the equipment to be purged of feed stock so that when this equipment subsequently carries sorbate product, the residue of feed stock in the equipment does not contaminate the sorbate product. When utilizing a desorbent-rich stream as a source of flush stream to remove feed stock from the lines and valve ports which carried feed stock into column 101 prior to the last previous advance of inlets and outlets to their positions shown in FIGURE 1 (i.e., from line 136 and port 12 in valve housing A), a convenient flow arrangement for this purpose involves providing a separate channel through plug B of valve 105 connecting port 8 with port 12 in fluid flow relationship, the channel being placed in the plug to provide an independent conduit through the plug whereby the desorbent-rich stream is withdrawn from column 101 and diverted into the internal channel which conveys the stream into line 136 and bed 12′ in an amount sufficient to replace the residual fluid not only in port 12 of valve 105, but also in line 136. Thus, the fluid stream flowing out of the downcomer from bed 7′, being rich in desorbent and containing some desorbed sorbate is withdrawn from the downcomer of bed 7′ through line 137 into port 8 of valve 105. The stream thus withdrawn from the process flow at a point downstream from the desorbent inlet, entering port 8 in line 137 displaces the desorbent-sorbate mixture left in line 137 and port 8 during the last preceding stage of the cycle when feed stock entered channel 113 from port 11 and bed 11′ was the first bed of the sorption zone in the contacting column. The desorbent-sorbate residue in line 136 as it is displaced flows from line 137 into port 8, through channel 138, and orifice 139 in the central core of the valve plug, into line 140 which conveys this stream at a rate controlled by valve 141, through line 142 to pump 143 which transfers the stream at an increased pressure into line 144 which returns the stream to the central core of valve 105, thereafter flowing through orifice 145 and channel 146 into port 12 in valve 103. The entry of the flush stream into port 12 first displaces feed stock formerly in the port into line 136 connecting port 12 with bed 12′ of the contacting column. As the flow of flush stream continues to displace the residual sorbate-desorbent mixture in line 137 and port 8 which, in turn, displaces feed stock in port 12 and line 136, the volume of flush is eventually sufficient to displace entirely all of the feed stock from port 12 and line 136, as determined by the flow rate of the flush stream (as set by valve 141 in line 142). The volume of flush stream for this purpose is predetermined to provide a flush stream volume at least equal to the combined volume of residual fluid in port 12 and in line 136. Because of the tendency of the flush stream to partially mix with the residual feed stock in the distribution lines and equipment, particularly at the front between the flush stream and the feed stock residue, the volumetric flow rate of flush is more preferably somewhat greater than the combined volume of the fluid in the fluid distribution lines and equipment such as line 136 and port 12 in the example illustrated in FIGURE 1, preferably a flow rate sufficient to provide from about 1.2 to about 3.5 volumes of flush stream per volume of such fluid to be displaced by the flush stream each shift of the feed stock inlet to the process flow. The effect of such replacement of feed stock with flush is that a mixture of sorbate component admixed with desorbent is left as a residue in the flushed port and distribution line until in the next following stage of the process cycle, sorbate component, admixed with desorbent, will be withdrawn as product stream through the flushed line and port. Neither is it detrimental that a mixture of sorbate with desorbent is left in the upstream side of the distribution center through which the desorbent-rich stream was withdrawn to initiate the flushing operation since this port and line (port 8 and line 137 in this example) will be used in the next following stage of the process cycle to convey desorbent to bed 8′, and will remain filled with desorbent until used for withdrawal of raffinate component, admixed with desorbent, in a still later stage of the process cycle. Accordingly, in the preferred manner of operating the present process, the volume of desorbent-rich flush stream withdrawn from the outlet of the upstream bed receiving fresh desorbent is equal to (i.e., not significantly greater than) that volume of fluid required to displace feed stock from the valve port and the line connecting the latter port with the contacting column.

In accordance with the present process another alternative source of flush fluid is the desorbed sorbate (desorbate) stream removed from the downstream outlet of the desorption zone. Thus, instead of withdrawing flush stream from the outlet of the first bed downstream from the desorbent inlet, sorbate may be withdrawn, for example, from the downcomer of bed 9′ (desorbate outlet) through line 127, into port 10 of valve 105 and thereafter by connection of line 140 with orifice 129 the desorbate flush stream is conducted through line 144 into port 12, as aforesaid to replace feed stock from port 12 and line 136.

As plug B of valve 105 slowly rotates in a counterclockwise direction, the flow of feed stock into port 1 (and thereafter into bed 1′) is gradually reduced because the opening in internal passageway 113 gradually becomes blocked by the solid portion of the valve body between port 1 and port 2. The solid portion of the housing is of such width, however, that as the flow of feed stock through internal passageway 113 is gradually reduced into port 1, the flow of feed stock through the passageway into port 2 gradually increases, until the entire flow of feed stock is directed into port 2 and none into port 1. At the stage of the cycle that feed stock enters the process through port 2, the inlet of the feed stock into the contacting column has shifted from line 106 to line 107 which connects with downcomer 103, the inlet to bed 2′. Line 106, now no longer carrying feed stock into upstream bed 1′ is, however, filled with feed stock, which is also present in port 1 of valve 105. Simultaneous with the shift in the line through which feed stock enters the contacting column from line 106 to 107, the raffinate component is withdrawn from the effluent stream leaving bed 4′ instead of bed 3′ through which it formerly left, through downcomer 147 instead of downcomer 114, and line 148 which transfers the raffinate through port 5, into channel 116 in the valve plug and thereafter through the raffinate outlet from the column.

Following completion of the next 1/12 aliquot of a complete cycle whereby the inlets and outlets of column 101 have been advanced to the next downstream bed, desorbent which previously entered bed 7′ through downcomer 120 is then introduced, through line 137 from port 8 of the valve housing into bed 8′ and sorbate component is withdrawn from bed 10′ through line 149 into port 11, leading to sorbate outlet conduit 130. As the shift in feed stock and desorbent inlets and raffinate and sorbate outlets occurs, channels 138 and 146 also simultaneously shift and the desorbent-rich stream from bed 8′ flows through conduit 150 into port 9 of the valve body, through line 138 and line 146 into port 1 and thereafter through line 106 into bed 1′ which previously received feed stock in the last preceding stage of the process cycle.

It is evident that as plug B rotates in valve 105, not only do the internal passageways throughout the plug carrying these streams to and from column 101 shift in equal increments, but also channels 138 and 146 which are the inlet and outlet passageways for the flush stream also simultaneously shift in the corresponding next adjacent downstream inlets and outlets for these streams. Thus, as the valve plug rotates in a counterclockwise direction, each of the ports in the valve housing and each of the lines connecting the internal passageways to these lines simultaneously shift in a counterclockwise direction throughout the 12 stages of the operation in each complete cycle until bed 1′ again receives feed stock to complete one complete cycle of operation.

Although the use of the desorbent-rich or sorbate rich stream internally derived from the contacting column are generally preferred sources of the flush stream in the present process, the fluid may also be supplied from an external source and may be of different composition. When derived externally the fluid is also characteristically a material which may be readily separated from the feed stock just as internally-derived sorbate and desorbent are individually separable from the feed stock. Preferred external fluids for use as flush stream herein are separable on the basis of the difference in boiling points of the respective purge fluid are the sorbate and raffinate components of the feed stock B, and more preferably, are light gases or liquids of low boiling points boiling outside of the feed stock or desorbent boiling points. When supplied from such an external source, valve 141 in line 140 is closed and valve 151 in line 152 connecting with line 142 is opened, thereby admitting purge fluid from its external source into line 144 and channel 146 feeding into the contacting column through fluid distribution center 105. Suitable gaseous materials for use as purge stream are such inert gases as nitrogen, carbon monoxide, carbon dioxide, methane, ethane, propane, etc. which ultimately escape from the process through the various effluent lines connecting the contacting column with the valve. The purge fluid may also consist of pure desorbent or pure sorbate supplied from an external source either of which enter the process flow and becomes mixed with the various fluid streams in the column and are ultimately removed through the raffinate and sorbate component outlets.

The flow rates of the various fluid streams into and from the column are adjusted to provide the maximum charging rate consistent with the maintenance of fixed bed conditions, the latter being dependent upon whether gas phase or liquid phase contacting conditions are maintained within the column and also is dependent upon the size of the sorbent particles and the degree of packing the sorbent within the confines of the sorbent beds. The particles of sorbent may vary in size from finely divided powders e.g., particles up to about 100 mesh size and preferably of a size greater than about 40 mesh) up to relatively large granular particles, preferably smaller than about 2 mesh size. When utilizing gaseous feed stocks and desorbents as well as a gaseous purge the charging rate of the various streams is below the rate at which fluidization of the sorbent particles occurs, usually at a rate not in excess of about 10 volumes of feed stock per volume of sorbent per minute.

The desorbent and purge or flush streams charged into the process flow are desirably recovered from the mixed raffinate and sorbate streams withdrawn from the process. In order to simplify the recovery of these components from the effluent streams, it is desirable that the materials selected for use as desorbent and purge fluid have boiling points which differ sufficiently from the raffinate and sorbate components of the feed stock to be readily separable therefrom by suitable fractionation means, and more preferably by simple distillation. Separation of the purge and desorbent by distillation is most efficiently effected when a material boiling at least 10° C. and more preferably, from 10° to 50° C. below the initial boiling point of the feed stock is utilized as purge and desorbent streams.

The contacting process of this invention is operated at conditions of temperature, pressure and at other reaction conditions which depend upon the particular feed stock involved, the particular sorbent utilized in the contacting zones and the required purity of the products. In most instances, because of the fixed bed relationship of the contacting zone to the various fluid streams flowing through the apparatus, liquid phase operation is preferred which may require operating the process at sufficiently high pressure levels to maintain the streams in liquid phase at the particular temperature of operation. For gas phase operation, the temperature maintained within the contacting zone may vary from 30° to about 300° C. and pressures may be within the range of from atmospheric to 20 or more atmospheres. When operated at liquid phase conditions, temperatures may vary from 0° to 200° C. and pressures may be maintained within the range of from atmospheric to 30 atmospheres or higher, depending upon the boiling range of the charge stock.

This invention is further illustrated with respect to specific embodiments thereof in the following examples which, however, are not intended to limit the scope of the invention necessarily in accordance with the embodiments illustrated therein.

*Example 1*

The process of this invention and the advantages of employing a flush stream to purge the lines and other equipment of feed stock between stages of the process are typically illustrated in the following runs in which a mixture of normal hexane, branched chain hexanes and cyclohexane is separated into one product consisting of relatively pure n-hexane and a secondary product consisting of mixed isohexanes and cyclohexanes, substantially free of n-hexane. In the following run, an apparatus comprising a series of 24 vertically stacked, interconnected fixed beds is provided, the twenty-four beds being arranged in four sections of six beds each. Each section of 6 beds is contained within a 3-inch (3½ inch O.D.) stainless steel pipe of approximately 4-ft. in length, each bed containing about 108 cubic inches of a molecular sieve sorbent consisting of pellets of composited calcium aluminosilicate (Linde Air Products Co., 5A molecular sieves) of random sizes within a range in which 95 percent by weight of the particles will pass through a 4 mesh screen and at least 98 percent by weight will be retained on a screen of 50 mesh size. Each bed contains an inlet nipple of restricted diameter (1¼-inch I.D.) at the top of the bed and an outlet nipple of the same size at the bottom of each of the beds, the outlet of one bed being the inlet of the next subadjacent bed, thereby providing a series of interconnected beds. The mass of sorbent in each bed is suspended above the outlet of the bed by an internal screen across the nipple. Lines also connect the bottoms of each section (6th bed from the top) to the top bed in each section, the 24th bed in series being connected by a line with the top of the first bed, the latter line containing a liquid pump which delivers liquid to the top of bed 1 at a pressure differential between the 24th and 1st bed of about 65 lbs./in.$^2$.

Four feed and withdrawal lines of ¼-inch pipe (one feed stock feed line, one raffinate withdrawal line, one desorbent feed line and one sorbate withdrawal line) are provided for the process and in the run utilizing a purge stream, a line connecting the appropriate ports of a central distributing valve which directs the internal flush stream to the line last carrying feed stock from the distributing valve to the contacting column is also provided.

The distributing valve is an apparatus having a design essentially similar in function to the valve illustrated in the accompanying diagrams, the valve containing 24 ports connected by 24 lines of equal length to the 24 fixed beds of sorbent, the lines connecting with said beds through T-joints between the nipples connecting each of the sorbent-packed beds. Thus, each bed may be fed with separate streams of desorbent, feed stock, and flush fluid or may have withdrawn therefrom separate streams of raffinate, sorbate and flush effluent by rotation of the valve plug having separate channels and ducts through which the fluid streams are charged into and removed from the sorbent beds as the valve plug rotates and cyclically advances all of the inlets and outlets to and from the column in a regular cycle completed each 55 minutes.

The process is started by charging a mixture of hexanes (40 weight percent n-hexane, 60 weight percent cyclohexane in Run 1 and 40 percent n-hexane, 60 percent isohexanes in Run 2, the isohexanes consisting of 2-methylpentane, 3-methylpentane, 2,3-dimethylbutane and 2,2-dimethylbutane) at a temperature of 40° C. and at a pressure of 110 lbs./in.$^2$ into bed 1 at a flow rate of 1.0 gallon/hr. At the same instant that feed stock flows into bed 1, the fluid distribution valve provides an open channel to the port in the valve body connected to the downcomer between beds 6 and 7 of the contacting column and after approximately 4 minutes on stream, a raffinate mixture of isohexanes (Run 2) or cyclohexane (Run 1) as hereinafter more specifically identified, issued from the outlet connected with said downcomer. As feed stock entered bed 1 and raffinate mixture was removed from bed 6, a stream of n-butane desorbent simultaneously flowed into the desorbent inlet of the distribution valve, the n-butane being charged at 40° C. and at approximately 100 lbs./in.$^2$ pressure. Flowing at a rate of 1.0 gallon of liquid n-butane per hour the n-butane enters the contacting column through the downcomer between beds 12 and 13, flowing downwardly through the subadjacent beds, displacing previously sorbed n-hexane from the sorbent as it flows in liquid phase through the series of beds.

As the desorbent stream contacts the molecular sieve sorbent particles containing previously sorbed n-hexane, the molar ratio of n-butane surrounding the sieves to the n-hexane sorbate increases until at some value of the molar ratio greater than 1 to 1, the n-butane displaces the sorbed n-hexane and a mixture of n-hexane sorbate and n-butane desorbent flows into the next subadjacent bed. The stream of mixed n-hexane and desorbent continues in its downstream flow until it reaches the outlet in the downcomer between beds 18 and 19 which is open by virtue of the position of the valve plug in the fluid distribution valve, thereafter flowing into a pipe connecting the outlet from bed 18 with the sorbate inlet port of the distributing valve.

At the position of the valve plug which admits feed stock into bed 1 the sorbate inlet port of the valve communicates with an internal passageway in the valve plug leading to a sorbate product outlet pipe connected to the valve, all other ports in the valve associated with beds 2 to 5, 7 to 11, 13 to 17 and 19 to 23 being closed. The flow of mixed desorbent and n-hexane flowing through the line connecting the downcomer from bed 18 to the inlet port 19 of the valve is sufficient to remove the net input of n-hexane into the process, the balance of the mixed sorbate-desorbent stream continuing its flow through subadjacent beds 19 to 24 (all closed to external flow at the instant position of the valve plug) into a line connected to the downcomer from bed 24 which cycles the net drawoff from the bottom of the column into the top of bed 1. A pump in the latter line raises the pressure on the effluent stream from the bottom of bed 24 (at 45 lbs./in.$^2$) to 110 lbs./in.$^2$ existing in bed 1.

The liquid stream of mixed isohexanes (Run 2) or cyclohexane (Run 1) and n-butane desorbent removed through the line connecting the downcomer from bed 6 is withdrawn through the raffinate outlet of the fluid distribution valve and continuously charged into an auxiliary fractionating column containing a reboiler which strips the volatile n-butane desorbent from the desired raffinate product (cyclohexane in Run 1 or isohexanes in Run 2), recovered from the distillation column as bottoms. The latter raffinate bottoms product in both Runs 1 and 2 contains 97.7 percent cyclohexane (Run 1) and 97.3 percent isohexanes (Run 2), and not more than 2.1 percent n-hexane.

The mixed desorbent-n-hexane sorbate product stream from the sorbate outlet of the distribution valve, when fractionally distilled yields a sorbate product consisting of 94.3 percent n-hexane. The overheads from both the raffinate and sorbate fractionators, consisting of n-butane is recycled to the desorbent inlet of the distribution valve for reuse in the process.

The plug of the distribution valve revolves slowly, but continuously, resulting in the flow of feed stock into bed 1, the withdrawal of raffinate from bed 6, the flow of desorbent into bed 13 and the withdrawal of sorbate from bed 18 for a period of 2.3 minutes, the flow of the above streams thereafter commencing into and from beds 2, 7, 14 and 19, respectively. After 3.1 minutes on flow, the respective streams discontinued flow into beds 1, 6, 13 and 18, leaving a residue of feed stock in port 1 of the distribution valve body and in the line connecting port 1 with bed 1. After approximately 57 minutes of continuous operation, the feed inlet, raffinate outlet, desorbent inlet and sorbate outlet streams had shifted through a complete cycle of 24 beds in the column, and feed stock once again started to flow into bed 1 to commence another cycle of operation.

*Example II*

In the following run, the flow rates of the various streams into and from the contacting column and the temperatures and pressures were maintained at the same values specified above in Example I, except that a modified fluid distribution valve was substituted for the distribution valve utilized in Example I. In the modified valve an internal channel was provided in the valve plug connecting the port associated with the first downstream bed from the bed into which desorbent is introduced with the port associated with the bed into which feed stock was introduced in the last previous stage (i.e., the first upstream bed removed from the bed currently receiving feed stock). The desorbent-rich inlet stream is thereby partially diverted from the valve port into an external line containing a pump which raises the pressure of the latter stream to the pressure existing in the upstream bed and discharges the stream at the adjusted pressure (depending upon the particular pressure level existing in the bed from which the stream is removed) through another channel in the valve plug, into the valve port associated with the upstream bed. Thus, when the position of the valve plug is such that the feed stock stream is currently being directed into bed 1, for example, a desorbent-rich stream is simultaneously withdrawn through the downcomer at the bottom of bed 13, through a line connecting the latter downcomer with port 14 in the body of the distribution valve, the desorbent-rich stream thereafter flowing through a channel in the valve plug into an external pipe containing a pump which transfers the desorbent-rich stream through a pipe returning the stream to the valve plug. The stream thus diverted from the desorption zone then enters another channel in the valve plug which conveys the stream to port 24 (the port through which the feed stock was introduced into the column prior to the rotation of the valve plug to the position in which the feed inlet stream currently enters port 1 in the valve body). Port 24 discharges the desorbent-rich stream from bed 13 into a line connecting port 24 with the downcomer from bed 23, the residual feed stock in port 24 and in the latter line thereby being forced to flow into bed 24 of the contacting column by joining the stream leaving bed 23 and entering bed 24. The flow of the desorbent-rich stream is controlled by means of a valve in the external line to permit only sufficient desorbent to flow through port 24 and the line connecting the latter port with the downcomer from bed 23 to purge the latter port and line of feed stock remaining in these conduits as a residue from the preceding stage of the cyclic process, prior to the rotation of the plug in the distribution valve to its position in the next stage when feed stock enters bed 2 of the contacting column. Because of back-mixing between the sorbate stream (which contains about 50 percent by volume of n-butane desorbent) with the residual feed stock in the port and line on the exit side of the valve, the quantity of desorbent purge stream required to free the port and line of feed stock is about 1.3 times the volume of fluid in the port and connecting line. The quantity of desorbent-rich flush stream required to free the port and connecting line on the outlet side of the valve of both feed stock and the sorbate stream flowing therein from the other side of the valve is about 2.1 times the volume of fluid in the port and connecting line.

At the same flow rates and process conditions maintained in Example I, above, and utilizing the present modification of the flow, the n-hexane sorbate product and mixed isohexane and cyclohexane raffinate products were produced in the same quantitative yield, but the product purities were substantially increased, the n-hexane sorbate product consisted of 99.1 percent n-hexane and the raffinate product contained less than 0.5 percent by weight of n-hexane.

*Example III*

A sorbate-rich stream was also used as a source of the flush stream for purging feed stock from the line and distribution valve port last previously carrying feed stock to the contacting column by modifying the valve plug to provide an internal channel in the plug connecting the outlet downcomer of bed 18 with the inlet downcomer of bed 24 (i.e., for the stage of the process cycle when feed stock enters bed 1). The use of the sorbate-rich stream (i.e., taken from the downstream outlet of the desorption zone) as the flush stream source results in a sorbate product purity of the same order of magnitude as the sorbate product of Example II, above (i.e., about 99±0.2 percent n-hexane), and a raffinate product containing approximately the same sorbate contamination (i.e., about 0.4±0.1 percent sorbate), but reduces the load on the fractional distillation columns which separate n-butane desorbent from the sorbate and raffinate effluent streams. In the present runs using a sorbate-rich flush stream the utilities load on the fractionators was reduced approximately 14 percent over the utilities load requirement of Example II, above.

We claim as our invention:

1. In a process for continuously separating the components of a mixture of fluids, at least one of which is selectively retained by contact of the mixture with a solid sorbent and at least one other component of which is relatively less sorbed by the sorbent, in which process a feed inlet stream comprising said feed mixture is continuously and successively charged into each zone of a plurality of serially interconnected contact zones, each zone containing a fixed mass of said sorbent, a stream of desorbent capable of displacing selectively retained sorbate component from said sorbent is substantially simultaneously charged into a downstream contact zone containing sorbate component retained by the sorbent in the last previous cycle of operation, an outlet stream comprising relatively less sorbed component of said mixture is substantially simultaneously withdrawn from a zone between the inlet of said zone receiving the feed stream and the inlet of the zone receiving said desorbent, a mixture of sorbate component and desorbent is substantially simultaneously withdrawn through a sorbate outlet between the inlet of the zone receiving desorbent and the inlet of the zone receiving said feed stream, a recycle stream of fluid is continuously withdrawn from the outlet of one fixed mass of sorbent and charged at a higher pressure into the inlet of the next downstream fixed mass of sorbent in the series of zones, each of the influent and effluent streams being directed during the process into and out of each of the zones through a fluid distribution center which advances the inlet and outlet points for said streams simultaneously and equidistantly in a downstream direction, the improvement in said process which comprises charging a flush stream comprising a fluid separable from said feed stock into the fluid inlet next upstream relative to the feed stream inlet in an amount not substantially exceeding the volume of fluid in the line of flow between the feed inlet into the fluid distribution center and the feed inlet to the contact zone receiving said feed stream.

2. The improvement of claim 1 further characterized in that said flush stream is a desorbent-rich stream removed from a fixed mass of sorbent downstream from the desorbent inlet.

3. The improvement of claim 1 further characterized in that said flush stream is a sorbate-rich stream withdrawn from the farthermost downstream mass of sorbent comprising the desorption zone.

4. The process of claim 1 further characterized in that said desorbent is an externally-derived fluid separable from said feed stock components and charged into said upstream fluid inlet directly from said external source.

5. The improvement of claim 1, further characterized in that the quantity of said flush stream charged into said fluid inlet upstream relative to the feed stream inlet is from about 1.2 to about 3.5 volumes of flush stream per volume of feed stock in said line of flow.

6. In a solid-fluid contacting process wherein the solid is maintained in a plurality of serially interconnected fixed beds, a fluid stream is passed from the first, through the series of interconnected beds, into the last bed of the series and the fluid stream issuing from the last bed is given an incremental increase in pressure and passed into said first bed of the series, a fluid feed stock mixture is charged into one of said beds, a first fluid efflux comprising at least one of the components of the fluid stream is removed from a bed which is downstream with respect to the bed into which said mixture is charged, a second input fluid having a composition different from the fluid feed stock mixture is charged into a bed which is further downstream from the bed into which said first fluid efflux is withdrawn, a second fluid efflux comprising one other component of the fluid stream is removed from a bed which is further downstream than the bed into which said second input fluid is charged and the balance of the fluid stream is recycled to the first bed in the series, the points of input of said mixture and said second input fluid and the points of withdrawal of said first and second efflux stream are advanced equidistantly to the next downstream bed in the series after a spaced interval of time, the improvement in said process which comprises flushing with a flush fluid the residual quantity of the fluid feed stock mixture remaining in the conduit supplying feed mixture to the last previous fixed bed receiving feed stock said flush fluid being separable from the feed stock and being in an amount not substantially in excess of the quantity required to flush said feed stock from said conduit prior to the removal of second efflux fluid through said conduit.

7. The process of claim 1 further characterized in that said process is effected at a temperature and at a pressure at which said feed stock, desorbent and flush stream are maintained in substantially liquid phase.

References Cited by the Examiner

UNITED STATES PATENTS

| | | | |
|---|---|---|---|
| 2,966,531 | 12/60 | Louis | 260—676 |
| 2,985,589 | 5/61 | Broughton et al. | 260—676 |

ALPHONSO D. SULLIVAN, *Primary Examiner.*